(12) United States Patent
Cho et al.

(10) Patent No.: US 7,866,171 B2
(45) Date of Patent: Jan. 11, 2011

(54) FOOD KEEPING REFRIGERATOR

(75) Inventors: Kwan-Shik Cho, Anyang-shi (KR);
Jong-Min Shin, Busan (KR);
Eun-Jeong Kim, Changwon-shi (KR);
Eun-Young Park, Ulsan (KR); Deul-Re Min, Changwon-shi (KR); Yeon-Yi Hwang, Busan (KR)

(73) Assignee: LG Electronics Inc., Seoul (KR)

( * ) Notice: Subject to any disclaimer, the term of this patent is extended or adjusted under 35 U.S.C. 154(b) by 1148 days.

(21) Appl. No.: 11/523,772

(22) Filed: Sep. 20, 2006

(65) Prior Publication Data

US 2008/0066475 A1    Mar. 20, 2008

(51) Int. Cl.
*F25B 49/00*    (2006.01)
*F25D 27/00*    (2006.01)

(52) U.S. Cl. .............................. 62/127; 62/129; 62/130; 362/92

(58) Field of Classification Search ................... 62/125, 62/126, 127, 129, 130; 362/92
See application file for complete search history.

(56) References Cited

U.S. PATENT DOCUMENTS

| 3,382,683 A | 5/1968 | Wiljanen |
| 5,816,060 A | 10/1998 | Brownell et al. |
| 6,070,419 A | 6/2000 | Chang |
| 6,367,276 B1 | 4/2002 | Kim et al. |
| 7,588,340 B2 * | 9/2009 | Bauer et al. ................... 362/92 |
| 7,621,139 B2 * | 11/2009 | Ha et al. ........................ 62/135 |
| 7,670,018 B2 * | 3/2010 | Kim et al. ...................... 362/92 |
| 2003/0072147 A1 * | 4/2003 | Pashley et al. ................ 362/92 |
| 2004/0107725 A1 | 6/2004 | Lee |
| 2006/0272341 A1 * | 12/2006 | Shin et al. ..................... 62/126 |
| 2008/0307818 A1 * | 12/2008 | Min et al. ..................... 62/264 |
| 2009/0052160 A1 * | 2/2009 | Park et al. ..................... 362/92 |

FOREIGN PATENT DOCUMENTS

| EP | 0 791 162 | 11/1995 |
| EP | 0 984 229 | 11/1995 |
| WO | WO 00/79192 | 12/2000 |

* cited by examiner

*Primary Examiner*—Marc E Norman
(74) *Attorney, Agent, or Firm*—Ked & Associates LLP

(57) ABSTRACT

A food keeping refrigerator is provided. The food keeping refrigerator keeps food in refrigerating and freezing chambers and refrigerates and freezes the food through a cooling device. The food keeping refrigerator preserves the freshness and nutrition of food for an extended period of time by emitting appropriate light to the food stored in the refrigerating and freezing chambers of the food keeping refrigerator. The food keeping refrigerator includes a storing device that stores food keeping information, a light generating device mounted inside the refrigerating and freezing chambers that generates light and emits the light to the food, and a controller that reads the food keeping information corresponding to the food from the storing device and controls the light generating device to emit the light according to the food keeping information.

35 Claims, 6 Drawing Sheets

FOOD KEEPING REFRIGERATOR

TECHNICAL FIELD

The present invention relates to a food keeping refrigerator, and more particularly, to a food keeping refrigerator which can preserve the freshness and nutrition of foods for an extended period of time by emitting appropriate light to the foods stored in storing units.

BACKGROUND ART

In general, a refrigerator includes an insulation box manufactured by charging a foamed insulation such as foamed polyurethane between an outer box made of a steel plate and an inner box made of a rigid synthetic resin by field foaming. The insulation box is partitioned off into storing chambers such as a freezing chamber, a refrigerating chamber and a vegetable chamber.

For example, a mechanical chamber is installed at the lower portion of the insulation box, and a compressor, a condenser and a ventilator for condenser which form a cooling device are installed therein. A cooler forming a freezing cycle with the cooling device is vertically installed on the rear surfaces of the storing chambers, and a ventilator for cooler is installed at the upper portion of the cooler. A partitioning plate is installed at the front portions of the cooler and the ventilator, and cool air ducts are installed between the partitioning plate and the rear wall of the insulation box.

When the compressor and the ventilator of the cooling device are operated, cool air cooled in the cool air ducts is discharged into the storing chambers. Among the storing chambers, the freezing chamber is cooled to a freezing temperature of −20° C., and the refrigerating chamber is maintained at a refrigerating temperature of +5° C. In addition, foods needing moisture such as vegetables are preserved in the vegetable chamber at an appropriate temperature.

For this, the temperatures inside the freezing chamber, the refrigerating chamber and the vegetable chamber are sensed, and the sensed temperatures are compared with preset reference temperatures. If the sensed temperatures are higher than the reference temperatures, the freezing cycle and the ventilator are driven at the same time for supplying cool air.

It is thus necessary to restrict respiration and transpiration of the foods (especially, vegetables) to maintain the freshness of the foods. As described above, the conventional refrigerator only controls the temperatures to maintain the freshness of the foods. Except for some foods experiencing low temperature lesion such as vegetables, respiration is restricted at a low temperature and transpiration is prevented at high humidity in many foods. However, the temperature control does not satisfy the user in respect of the freshness of the foods. Also, in the conventional refrigerator, the user must individually find appropriate keeping methods of each food. Even if the user finds the appropriate keeping methods of each food, he/she cannot acquire information on which parts of the storing chambers can minimize reduction of the freshness and nutrition of the foods and keep the foods for an extended period of time.

DISCLOSURE OF THE INVENTION

The present invention is achieved to solve the above problems. An object of the present invention is to provide a food keeping refrigerator which can keep foods for an extended period of time by light and/or temperature control.

Another object of the present invention is to provide a food keeping refrigerator which can store food keeping information in advance and perform light and/or temperature control according to the food keeping information corresponding to foods.

Yet another object of the present invention is to provide a food keeping refrigerator which can store food keeping information and light generation information in advance, and display optimum keeping positions of foods according to light states of a freezing chamber and/or a refrigerating chamber.

In order to achieve the above-described objects of the invention, there is provided a food keeping refrigerator which keeps foods in a refrigerating chamber and/or a freezing chamber, and refrigerates and/or freezes the foods through a cooling unit, the food keeping refrigerator including: a storing means for storing food keeping information; a light generating means mounted on the refrigerating chamber and/or the freezing chamber, for generating light and emitting the light to the foods; and a control unit for reading the food keeping information corresponding to the foods from the storing means, and controlling the light generating means to emit the light according to the food keeping information.

Preferably, the refrigerating chamber and/or the freezing chamber includes a plurality of storing units, and the light generating means is installed in each storing unit.

Preferably, the storing units are opaquely isolated from each other.

Preferably, the food keeping refrigerator further includes an input means for receiving names of the foods from the user, and the control unit reads the food keeping information corresponding to the names of the foods.

Preferably, the food keeping refrigerator further includes a reading means for reading identification information from food identifying means which are formed inside and/or outside the foods and/or at storing containers of the foods and which have the identification information of the foods, and the control unit reads the food keeping information corresponding to the identification information.

Preferably, the reading means includes an RFID reading unit and/or an image photographing unit and/or a barcode reading unit.

Preferably, the food keeping information includes at least information on colors of the light.

Preferably, the food keeping information further includes information on keeping temperatures of the foods.

Preferably, the control unit controls the cooling unit according to the keeping temperatures.

Preferably, the light generating means includes a plurality of LEDs for emitting different colors of light.

Preferably, the light generating means generates and emits light having a color corresponding to the food keeping information, by combining the colors of the plurality of LEDs.

Preferably, the light generating means includes at least a dimmer for generating white light, one or more filters for transmitting light having a predetermined color from the white light, and one or more optical fibers for emitting the light having the color.

Preferably, the light generating means generates and emits light having a color corresponding to the food keeping information, by combining the colors of the optical fibers.

According to another aspect of the present invention, there is provided a food keeping method for a refrigerator which keeps foods in a refrigerating chamber and/or a freezing chamber and refrigerates and/or freezes the foods through a cooling unit, the food keeping method including the steps of:

reading food keeping information of predetermined food; and generating light and emitting the light to the food according to the food keeping information.

According to yet another aspect of the present invention, there is provided a food keeping refrigerator which keeps foods in a refrigerating chamber and/or a freezing chamber having a plurality of storing units, and refrigerates and/or freezes the foods through a cooling unit, the food keeping refrigerator including: a storing means for storing food keeping information having optimum keeping positions of foods; a light generating means mounted on the storing units, for generating light and emitting the light to the foods stored in the storing units; a control unit for enabling the light generating means to emit the light, reading the food keeping information corresponding to the foods, comparing the food keeping information with the light emitted in the storing units, and deciding the optimum keeping positions of the foods among the storing units; and a display means for displaying the optimum keeping positions of the foods.

According to yet another aspect of the present invention, there is provided a food keeping method for a refrigerator which keeps foods in a refrigerating chamber and/or a freezing chamber having a plurality of storing units, and refrigerates and/or freezes the foods through a cooling unit, the food keeping method including the steps of: reading food keeping information corresponding to predetermined food; reading light generation information of the storing units; comparing the food keeping information with the light generation information, and deciding an optimum keeping position of the food among the storing units; and displaying the optimum keeping position to the user.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A right and left open type refrigerator having a freezing chamber and a refrigerating chamber at both sides in accordance with preferred embodiments of the present invention will now be described in detail with reference to the accompanying drawings. However, it is recognized that the scope of the present invention should not be limited to these preferred embodiments but to the claims as hereinafter recited.

Figure 1:
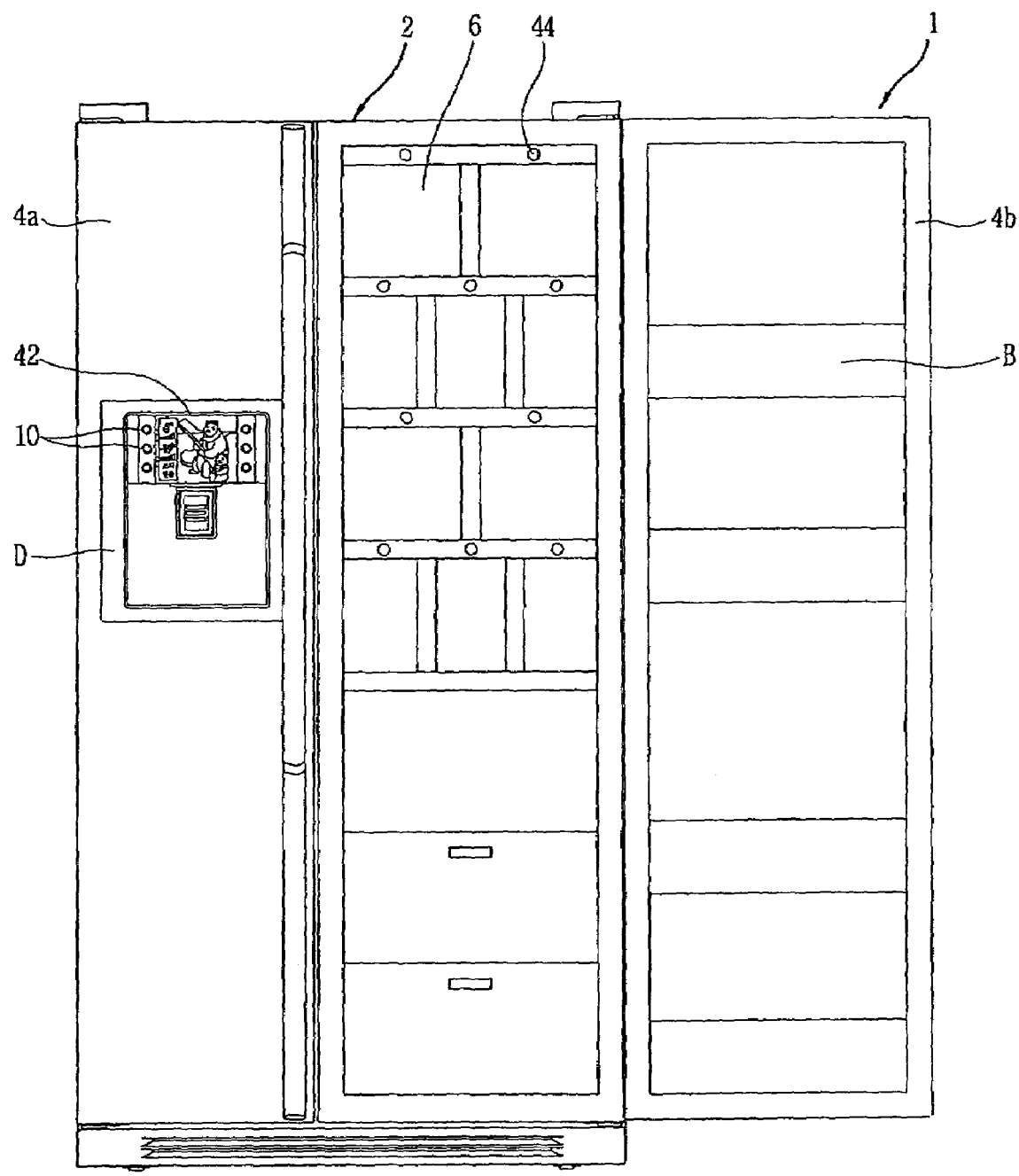
FIG. 1 is a front view illustrating a food keeping refrigerator in accordance with the present invention.
Figure 2:
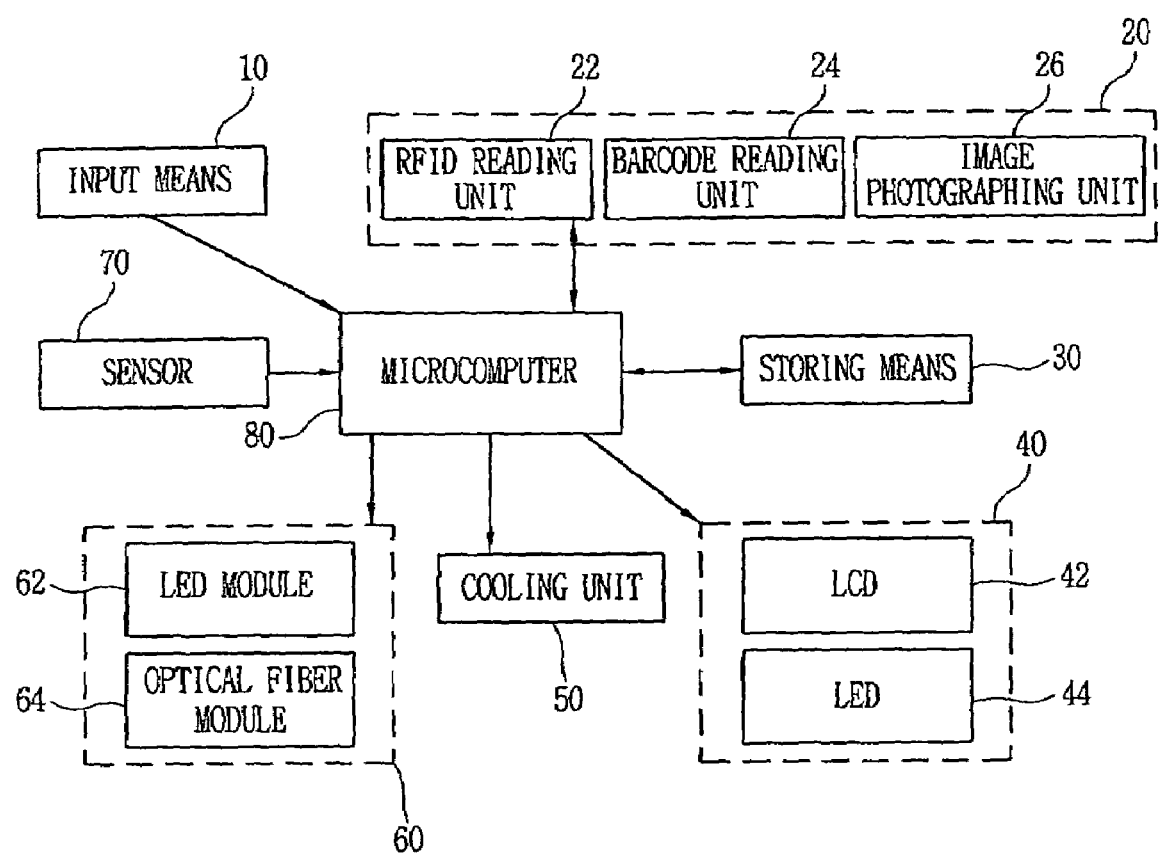
FIG. 2 is a block view illustrating the food keeping refrigerator in accordance with the present invention.

FIG. 1 is a front view illustrating the food keeping refrigerator in accordance with the present invention, and FIG. 2 is a block view illustrating the food keeping refrigerator in accordance with the present invention.

Referring to FIG. 1, in the food keeping refrigerator 1, a freezing chamber door 4a and a refrigerating chamber door 4b are installed to be opened and closed on a front surface of a refrigerator main body 2 having a freezing chamber and a refrigerating chamber at both sides, a plurality of storing units 6 for keeping foods are formed in the freezing chamber and the refrigerating chamber, various sensors 70 for sensing various keeping conditions are installed in each storing unit 6, a control means (not shown) for controlling light generation and emission according to food keeping information is installed at the side of the freezing chamber door 4a, and a display means (not shown) for displaying various information from the control means is installed at the side of the freezing chamber door 4a.

Here, a cooling unit 50 including a compressor (not shown), a condenser (not shown), a capillary tube (not shown) and an evaporator (not shown) is built in the refrigerator main body 2, and a cool air circulation path (not shown) and a cool air circulation fan (not shown) are built in the inner wall of the refrigerator main body 2, for circulating cool air. Also, cool air circulation holes (not shown) are formed on the inner wall so that the air passing the peripheral regions of the evaporator can be supplied to each storing unit 6, and dampers (not shown) are installed to be opened and closed on the cool air circulation holes or the partition wall between the freezing chamber and the refrigerating chamber.

The operations of the compressor, the damper and the cool air circulation fan are controlled by the control means according to load. Therefore, the cool air amount is controlled to adjust the temperature and humidity inside the refrigerator 1.

The cooling unit 50 is able to adopt a direct cooling method as well as the above-described indirect cooling method.

Door baskets B for keeping foods are formed inside the freezing chamber door 4a and the refrigerating chamber door 4b. A dispenser unit D is installed at the side of the freezing chamber door 4a so that the user can easily take out ice, etc., and a home bar (not shown) is installed at the side of the refrigerating chamber door 4a so that the user can easily take out water and beverages.

The control means is installed outside the freezing chamber door 4a and easily operated by the user, and the display means is also installed to notify the operation state of the refrigerator 1 to the user.

The storing units 6 are formed in the freezing chamber and the refrigerating chamber, for individually storing various foods. The storing units 6 are divided into regions for storing general foods and regions for storing foods needing special management. Only the regions of the storing units 6 which can perform special food management will later be explained.

Here, the storing units 6 include a refrigerating chamber, a freezing chamber and a vegetable chamber.

The storing units 6 are isolated by various shelves and/or partition walls. The shelves and/or partition walls for isolating the storing units 6 are opaque to light, so that the light emitted from each of the storing units 6 cannot reach the other storing units 6. Special automatic open/close devices can be installed to be automatically or manually opened and closed on the front surfaces of the storing units 6.

Accordingly, when the optimum storing unit 6 is set by the control means among the storing units 6, the automatic open/close device of the optimum storing unit 6 is opened by the control means, so that the user can directly put food into the optimum storing unit 6.

The storing units 6 can include a transfer shelf (not shown) installed to be movable in the up/down direction or the forward/backward direction. The transfer shelf is disposed in the specific position in which the user can easily put food when opening the freezing chamber door 4a or the refrigerating chamber door 4b, and transferred to the optimum storing unit 6 when closing the freezing chamber door 4a or the refrigerating chamber door 4b.

If the optimum storing unit 6 is set by the control means, the transfer shelf is transferred to the optimum storing unit 6. If not, the transfer shelf is transferred to a specific position by the user, or stopped at the position.

The sensors 70 can be installed in the whole storing units 6, for precisely measuring the keeping conditions (at least, temperature) of each storing unit 6, but are installed in some storing units 6 in consideration of a measurement range.

The keeping conditions of each storing unit 6 that can be measured by the sensors 70 include temperature, humidity, cool air circulation, air composition ratio, vibration and light intensity. A variety of sensors including a temperature sensor, a humidity sensor and a flow sensor are used to measure the keeping conditions.

The control means includes an input means 10 for receiving commands and food information from the user, a reading means 20 for reading identification information formed on foods and/or food packing sheets and/or storing containers, a storing means 30 for storing food keeping information and light generation information, a display means 40 for displaying optimum keeping positions, etc. to the user, a cooling unit 50 for performing a refrigerating and/or freezing process, a light generating means 60 for generating light and emitting the light to the storing units 6, sensors 70 for sensing various keeping conditions of the freezing chamber and/or the refrigerating chamber and/or the storing units 6, and a microcomputer 80 for preserving the freshness and nutrition of the foods by generating appropriate light for the foods kept in the refrigerating chamber and/or the freezing chamber and emitting the light, by controlling the aforementioned elements. The food keeping refrigerator 1 can further include a main microcomputer (not shown) for performing freezing and refrigerating control. A communication line is connected between the main microcomputer and the microcomputer 80 for data communication. In another case, the food keeping refrigerator 1 can perform the freezing and refrigerating control through the microcomputer 80. Also, the food keeping refrigerator 1 includes a power supply means (not shown) for supplying power to each element.

In detail, the input means 10 receives the command (selection of a food keeping service using light, selection of an optimum keeping position providing service discussed later, input or selection of a name of food, etc.) from the user. The input means 10 is associated with a user interface displayed by the display means 40, and formed in a button or touch pad type.

The reading means 20 includes an RF reading unit 22 for reading identification information stored in RFID displayed on or adhered to food, and/or a barcode reading unit 24 for reading identification information by a barcode, and/or an image photographing unit 26 for acquiring an outer image of food. Here, the identification information includes at least a name (kind) of food or an equivalent code thereof.

The RF reading unit 22 can be installed on the display means 40 (especially, near an LCD 42) (on the front surface of the refrigerator 1) for the convenience of the user, or installed in the refrigerator 1. In the case that the RF reading unit 22 is installed near the display means 40, when the user intends to put food into the refrigerator 1, the user positions the food near the RF reading unit 22 to read the identification information. In the case that the RF reading unit is installed inside the refrigerator 1, after the user puts the food into the refrigerator 1, the RF reading unit 22 reads the RFID of the food.

The barcode reading unit 24 reads the barcode printed on the food, the food container (or storing container) or the food packing sheet. The barcode reading unit 24 is installed on the display means 40 (especially, near the LCD 42) for the convenience of the user. The barcode reading unit 24 reads the food information according to the general barcode reading method.

The image photographing unit 26 acquires the image of the food which will be kept in the storing unit 6. This image is compared with the previously-stored image information of the food by the microcomputer 80. A general digital camera can be used as the image photographing unit 26.

The storing means 30 stores the user interface displayed to the user, so that the user can input selection of the food keeping service using light provided by the food keeping refrigerator 1, and the name of the food or selection of the food. Also, the storing means 30 stores the food keeping information. The food keeping information includes keeping methods for each food. Especially, the keeping methods include information on light, namely, advantageous characteristics of light in keeping the foods (for example, light color, light intensity, etc.). The following Table 1 shows light characteristics of foods obtained by experiments. Here, R denotes a red color, G denotes a green color, B denotes a blue color, W denotes a white color and Y denotes a yellow color, and combinations of the characters denote combinations of light having the corresponding colors.

TABLE 1

| Name | Advantageous characteristic | Disadvantageous characteristic |
| --- | --- | --- |
| Cabbage | R, W- tissues less open | C, YW- leaves open |
|  | B, GY- discolored, little tissue change | C, R, RB, BW- leaves open, discolored to black |
|  | G- least discolored | C, RB, RW- leaves open |
| Pak-choi | W, YB, YW- maintain initial state most | C- discolored, seriously dry |
|  | GW- less dry | R- very seriously dry |
|  | RB- keep tissues most, less discolored | B, C, G- discolored to yellow, seriously dry |
| Strawberry | RY, RW- maintain initial property well | C, Y- many changes |
|  | B, GY- less discolored, keep tissues well | G, BW- many molds |
|  | RW- less discolored, keep tissues well | C, RB, G- many molds |

As shown in the above Table 1, the food keeping information includes the advantageous characteristics of light in keeping each food.

The food keeping information includes names of foods or identification information (for example, identification information stored in RFID, barcode information, image information, etc.).

When each storing unit 6 generates and emits light, the storing means 30 includes light generation information on the light generated and emitted in each storing unit 6. The light generation information includes the positions of the storing units 6 and the characteristics of the light emitted in the storing units 6.

In the case that the food keeping information and/or the light generation information corresponding to the foods stored in the refrigerating chamber and/or the freezing chamber does not exist, the storing means 30 stores a corresponding notice message.

The display means 40 includes an LCD 42 for displaying user interfaces and optimum keeping positions discussed later, and LEDs 44 for displaying the storing units 6 corresponding to the optimum keeping positions. The operation of the display means 40 is controlled by the microcomputer 80.

In detail, the LCD 42 is formed near the input means 10 on the front surface of the freezing chamber door 4a for the convenience of the user.

The LCD 42 displays the insides of the freezing chamber and the refrigerating chamber in setting the optimum storing unit 6, and can individually display the position of the optimum storing unit 6.

The LEDs are installed to correspond to the storing unit 6, respectively. If the optimum storing unit 6 is set, the LED 44 of the optimum storing unit 6 is operated so that the user can recognize the optimum storing unit 6 and put food into the optimum storing unit 6. For example, it is possible to flicker the LED 44 installed near the storing unit 6 corresponding to the optimum keeping position.

The cooling unit 50 and the sensors 70 have been described above. The light generating means 60 will now be explained. The light generating means 60 (at least LEDs of an LED module 62 and optical fibers of an optical fiber module 64) is installed at one-side portions, the facing sides, the top surfaces or the bottom surfaces of each storing unit 6, for generating light and emitting the light to foods under the control of the microcomputer 80. Here, the light exists in a visible ray range and has a color by wavelength.

The light generating means 60 includes the LED module 62 having the plurality of LEDs and controlling light generation and emission of the LEDs, and/or the optical fiber module 64 having the plurality of optical fibers and controlling light generation and emission of the optical fibers.

The LED module 62 includes one or more LEDs for generating and emitting the same color (wavelength) of light (single color type), or a plurality of LEDs for generating and emitting different colors of light (combination type).

Figure 3A:
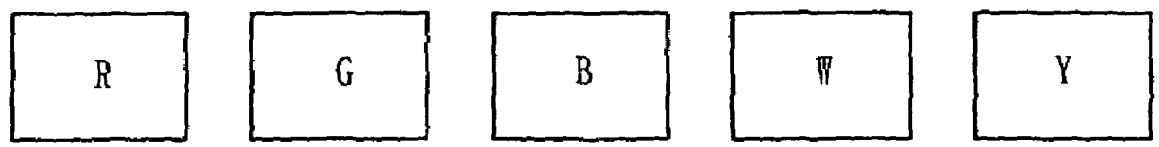
FIGS. 3a and 3b are exemplary views illustrating light emission.

As depicted in FIG. 3a, in the case of the single color type LED module 62, for example, R, G, B, W and Y LEDs are installed in the storing units 6 of the refrigerating chamber and the freezing chamber, respectively, and the storing units 6 are opaquely isolated from each other.

Figure 3B:

As shown in FIG. 3b, in the case of the combination type LED module 62, for example, RG, RB, RW, and RY LEDs are installed in the storing units 6 of the refrigerating chamber and the freezing chamber, respectively, and the storing units 6 are opaquely isolated from each other. In the combination type LED module 62, for example, the RG storing unit 6 generates and emits light having three colors, R, G and RG. In addition to combination of two colors of LEDs, the combination type LED module 62 can combine three to five colors of LEDs. Especially, the LED module 62 comprised of the five colors of LEDs can generate and emit almost all colors. Therefore, it can be applied to all foods having light characteristics. The constitution of the LEDs can be formed in various shapes by combination of the LEDs.

As identical to a general optical fiber system, the optical fiber module 64 includes optical fibers (not shown), a dimmer (not shown) and/or a filter (not shown). The optical fibers are made of glass or plastic. In the present invention, light is emitted from the sides of the optical fibers according to a side light method. The dimmer which generates light (generally, white light) and transfers the light to the optical fibers uses a metal halide lamp or a halogen lamp as a light source. The filter receives the light from the dimmer, and transfers visible rays and/or specific wavelengths (specific colors) of light of the visible rays to the optical fibers.

The optical fiber module 64 includes one or more dimmers and/or filters, generates the same color or different colors of light, and transfers the light to the optical fibers, thereby emitting a single color or plural colors through the optical fibers. The single color type and the combination type are identical to those of the LED module 62.

The microcomputer 80 controls the whole refrigerating and/or freezing process, and further provides the food keeping service using light.

The microcomputer 80 includes at least one CPU (not shown). Here, the microcomputer 80 can include the storing means 30 or include only processors such as the CPU. For detailed explanation of data stored in the storing means 30, the microcomputer 80 and the storing means 30 will now be explained as individual elements.

The operation of the microcomputer 80 will now be described in detail with reference to FIGS. 4 and 5. When the user selects the food keeping service using light through the input means 10, or when the microcomputer 80 arbitrarily selects the food keeping service using light, the following food keeping method is carried out.

Figure 4:
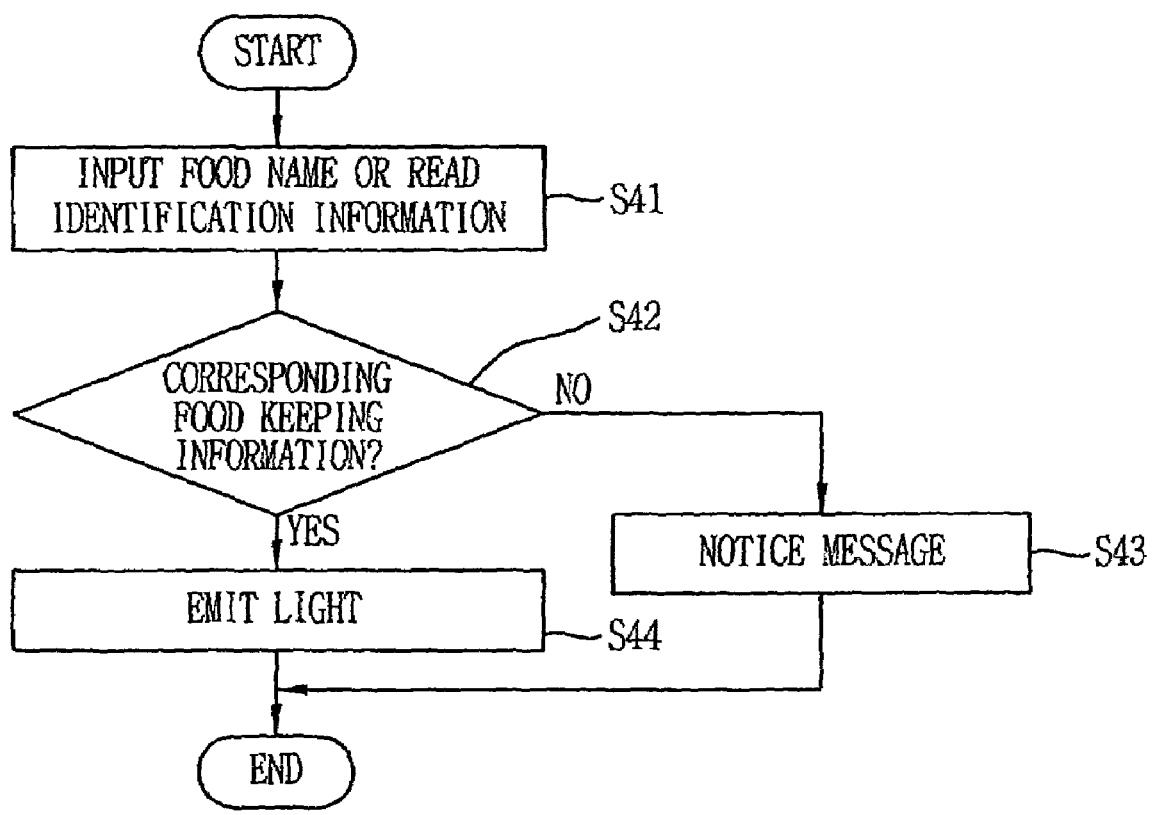
FIG. 4 is a flowchart showing sequential steps of a food keeping method in accordance with a first embodiment of the present invention.

FIG. 4 is a flowchart showing sequential steps of a food keeping method in accordance with a first embodiment of the present invention.

In detail, in step S41, the microcomputer 80 receives a name of food from the input means 10 or acquires identification information read by the reading means 20. Here, the microcomputer 80 can display the user interface on the LCD 42 for user input.

In step S42, the microcomputer 80 reads the food keeping information stored in the storing means 30, and decides whether the food keeping information corresponding to the name of the food or the identification information exists. If so, the microcomputer 80 goes to step S44, and if not, the microcomputer 80 goes to step S43.

In step S43, the microcomputer 80 reads a notice message relating to absence of the food keeping information from the storing means 30, and displays the notice message on the LCD 42.

In step S44, the microcomputer 80 transmits an operation command to the light generating means 60 according to light characteristics included in the food keeping information corresponding to the food, and the light generating means 60 generates and emits light according to the operation command. Therefore, the food is exposed to the light.

In the first embodiment, the light generating means 60 is formed in the combination type. The microcomputer 80 enables the light generating means 60 to generate and emit light according to the light characteristics included in the food keeping information of the food stored in the storing unit 6. The microcomputer 80 displays a picture or text notifying the storing unit 6 on the LCD 42, or indicates the storing unit 6 by the LED 44, so that that the user can easily find the storing unit 6.

The microcomputer 80 can further control a temperature of the storing unit 6 for storing the food, by reading a temperature condition included in the food keeping information. Also, the microcomputer 80 can search for the storing unit 6 corresponding to the temperature condition, and control the light characteristics of the storing unit 6.

Figure 5:
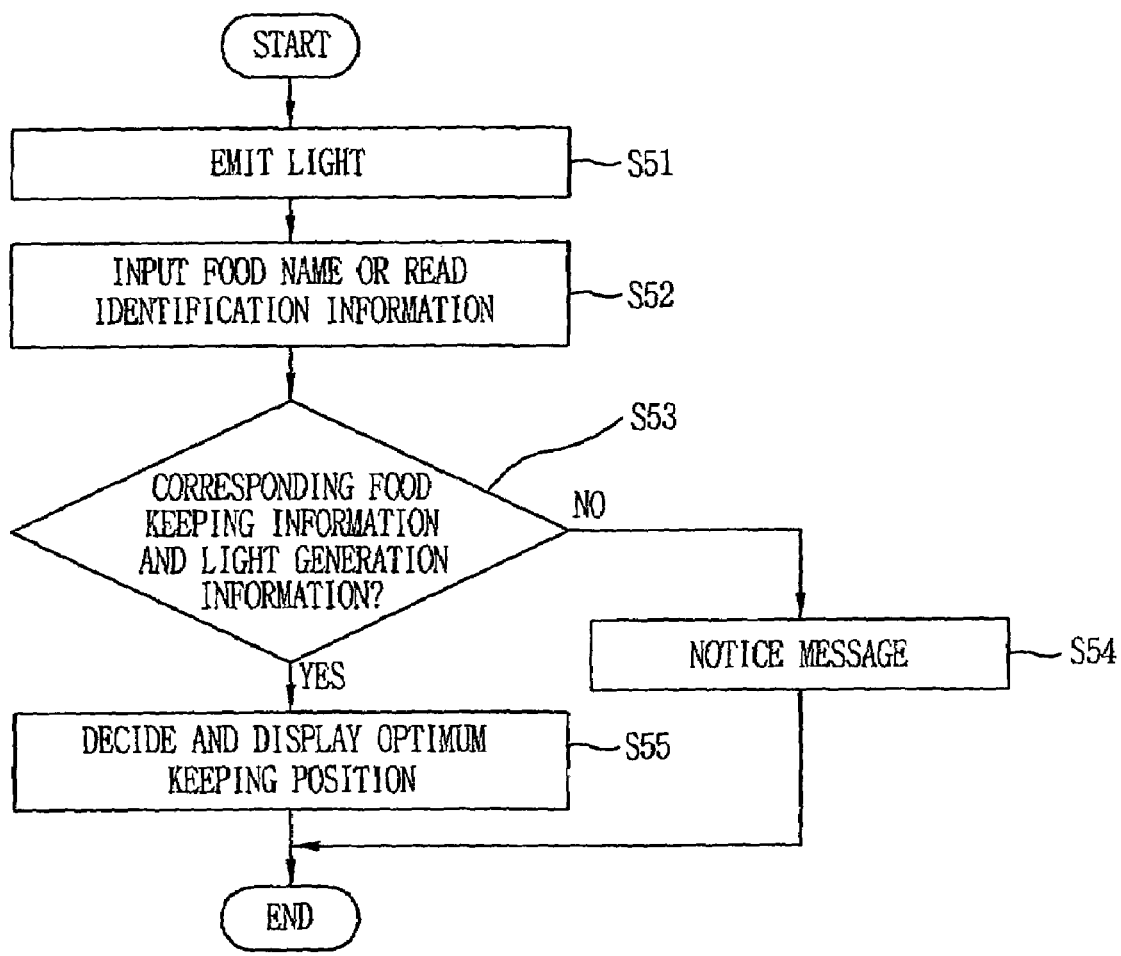
FIG. 5 is a flowchart showing sequential steps of a food keeping method in accordance with a second embodiment of the present invention.

FIG. 5 is a flowchart showing sequential steps of a food keeping method in accordance with a second embodiment of the present invention. The second embodiment can be applied when the light generating means 60 is formed in the single color type and installed in each storing unit 6, or when the user additionally puts food while the combination type light generating means 60 generates and emits light in the current storing unit 6. The microcomputer 80 stores the current light generation information in the storing means 30.

In detail, in step S51, the microcomputer 80 enables the single color type light generating means 60 to generate and emit a single color of light in each storing unit 6, or the combination type light generating means 60 to generate and emit preset colors of light. Here, the microcomputer 80 can perform temperature control in each storing unit 6.

In step S52, the microcomputer 80 receives a name of food from the input means 10 or acquires identification information read by the reading means 20. Here, the microcomputer 80 can display the user interface on the LCD 42 for user input.

In step S53, the microcomputer 80 reads the food keeping information and the light generation information stored in the storing means 30, and decides whether the food keeping information and the light generation information corresponding to the name of the food or the identification information exists. If so, the microcomputer 80 goes to step S55, and if not, the microcomputer 80 goes to step S54.

In step S54, the microcomputer 80 reads a notice message relating to absence of the food keeping information and the light generation information from the storing means 30, and displays the notice message on the LCD 42.

In step S55, the microcomputer 80 searches for the storing unit 6 satisfying the light characteristics included in the food keeping information corresponding to the food according to the light generation information. The microcomputer 80 decides the storing unit 6 satisfying the light characteristics as the optimum keeping position of the food, and displays the storing unit 6 corresponding to the optimum keeping position on the LCD 42 in the form of a picture or text, or indicates the storing unit 6 by the LED 44.

The step S51 can follow the step S55. That is, the microcomputer 80 enables the light generating means 60 of the storing units 6 which do not store food to stop generation and emission of light. After the user acquires the information on the optimum keeping position, or after the user puts food into the storing unit 6 according to the information, the microcomputer 80 transmits the operation command to the light generating means 60.

Figure 6:
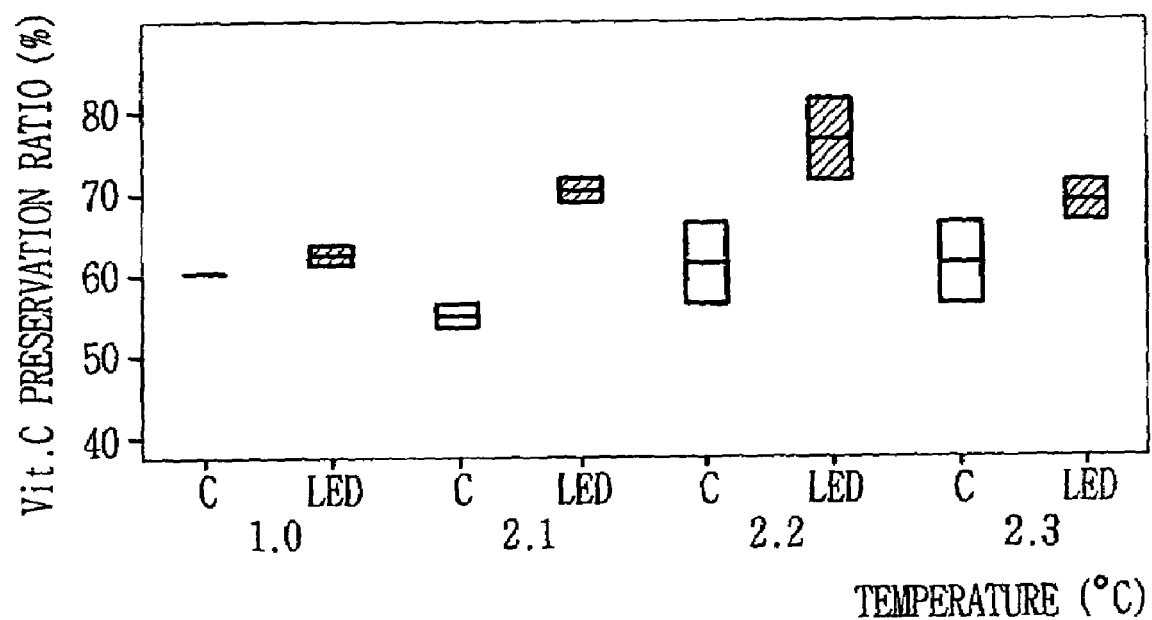
FIG. 6 is a graph showing effects of the food keeping method in accordance with the present invention.

FIG. 6 is a graph showing effects of the food keeping method in accordance with the present invention. This graph was obtained by keeping the food in each light condition and/or temperature condition for about 25 days.

In FIG. 6, the axis of abscissa relates to a temperature and the axis of ordinates relates to a preservation ratio (%) of vitamin C of a strawberry. Here, C keeps the strawberry according to the conventional keeping method (temperature control) which does not expose the strawberry to light, and LED keeps the strawberry according to the food keeping method which exposes the strawberry to light having a color corresponding to the food keeping information and performs temperature control. In addition, the length of each rectangle means a deviation in experiment.

As illustrated in FIG. 6, when the storing units 6 have the same keeping temperature, the center point (center of deviation) of the preservation ratio (%) rectangle of vitamin C of C is lower than the center point (center of deviation) of the preservation ratio (%) rectangle of vitamin C of LED. Even if the preservation ratio (%) of vitamin C of C is improved due to keeping temperature variations of the storing unit 6, the preservation ratio (%) of vitamin C of LED is more improved. Even in consideration of the deviation of the preservation ratio (%) rectangle of vitamin C of LED, the lowest preservation ratio (%) of vitamin C of LED is higher than the highest preservation ratio (%) of vitamin C of C at each temperature.

That is, vitamin C of the strawberry is more preserved by the food keeping method of the present invention than the conventional food keeping method.

As discussed earlier, in accordance with the present invention, the food keeping refrigerator keeps the foods for the extended period of time by preventing the dryness of the foods and improving the nutrition of the foods by the light and/or temperature control.

In addition, the food keeping refrigerator provides the convenient food keeping service to the user by storing the food keeping information in advance, and performing the light and/or temperature control according to the food keeping information corresponding to the foods.

Furthermore, the food keeping refrigerator easily keeps the foods for the extended period of time by storing the food keeping information and the light generation information in advance, and displaying the optimum keeping positions of the foods according to the light states of the freezing chamber and/or the refrigerating chamber.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A refrigerator which stores items in at least one of a refrigerating chamber or a freezing chamber so as to respectively refrigerate or freeze the items stored therein using a cooling device, the refrigerator comprising:
    a storing device that stores keeping information associated with the items stored in the refrigerator, the keeping information including light colors associated with the items stored in the refrigerator;
    a light generator mounted inside the at least one of the refrigerating chamber or the freezing chamber so as to generate light and emit the generated light to the items stored therein; and
    a controller that reads the keeping information stored in the storing device and controls the light generator to emit light having a color selected based on the keeping information of the items stored in the refrigerator, wherein the selected color of light is selected so as to maintain a freshness level of the corresponding item.

2. The refrigerator of claim 1, wherein the at least one of the refrigerating chamber or the freezing chamber comprises a plurality of storing chambers and the light generator is installed in each of the plurality of storing chambers.

3. The refrigerator of claim 2, wherein the plurality of storing chambers are opaquely isolated from each other.

4. The food keeping refrigerator of claim 1, further comprising an input device that receives names of the items stored in the refrigerator from a user, wherein the controller reads the keeping information corresponding to the names of the items.

5. The refrigerator of claim 1, further comprising a reading device that reads identification information from a food identifying device provided at an inside or an outside the item, or at storing containers of the item, wherein controller reads the keeping information corresponding to the identification information of the item.

6. The refrigerator of claim 5, wherein the reading device comprises at least one of an RFID reading device, an image photographing device, or a barcode reading device.

7. The refrigerator of claim 1, wherein the keeping information further comprises information on keeping temperatures of the items.

8. The refrigerator of claim 7, wherein the controller controls the cooling device according to the information on the keeping temperatures of the items.

9. The refrigerator of claim 1, wherein the light generator comprises a plurality of LEDs that emits different colors of light.

10. The refrigerator of claim 9, wherein the light generator generates and emits light having a color corresponding to the keeping information by combining the colors of light of the plurality of LEDs.

11. The refrigerator of claim 1, wherein the light generator comprises at least one dimmer that generates white light, at least one filter that transmits light having a predetermined color from the white light, and at least one optical fiber that emits the light having the predetermined color.

12. The refrigerator of claim 11, wherein the light generator generates and emits light having a color corresponding to the keeping information by combining the colors of the one or more optical fibers.

13. A keeping method for a refrigerator which stores items in at least one of a refrigerating chamber or a freezing chamber so as to respectively refrigerate or freeze the items using a cooling device, the method comprising:
reading keeping information of one or more predetermined items stored in the refrigerator; and
generating light and emitting the light onto the items stored in the refrigerator, the light having a color selected based on the keeping information, wherein the keeping information includes light colors selected so as to maintain a freshness level of the items stored in the refrigerator.

14. The method of claim 13, further comprising receiving a name of the one or more predetermined items from a user, wherein the reading the keeping information includes reading the keeping information corresponding to the name of the item.

15. The method of claim 13, further comprising reading identification information from an identifying provided at an inside or an outside the item, or at a storing container of the item, wherein reading the keeping information includes reading the keeping information corresponding to the identification information.

16. The method of claim 13, wherein the keeping information further comprises information on a keeping temperature of the one or more predetermined items.

17. The method of claim 16, further comprising controlling the cooling device according to the keeping temperature information.

18. The method of claim 13, wherein emitting the light further comprises emitting different colors of light to the items at the same time.

19. A food keeping refrigerator which keeps foods in at least one of a refrigerating chamber or a freezing chamber having a plurality of storing chambers formed therein so as to respectively refrigerate or freeze foods stored therein through a cooling device, the food keeping refrigerator comprising:
a storing device that stores food keeping information including optimum keeping positions of foods;
a light generating device mounted on the plurality of storing chambers, wherein the light generating device generates light and emits the generated light to the foods stored in the plurality of storing chambers;
a controller that enables the light generating device to emit the light, that reads the food keeping information corresponding to the foods, that compares the food keeping information with the light emitted in the plurality of storing chambers, and that determines the optimum keeping positions of the foods among the plurality of storing chambers; and
a display device that displays the optimum keeping positions of the foods.

20. The food keeping refrigerator of claim 19, wherein the plurality of storing chambers are opaquely isolated from each other.

21. The food keeping refrigerator of claim 19, further comprising an input device that receives names of the foods from a user, wherein the controller reads the food keeping information corresponding to the names of the foods.

22. The food keeping refrigerator of claim 19, further comprising a reading device that reads identification information from a food identifying device provided at an inside or an outside the foods, or at storing containers of the foods which include the identification information of the foods, wherein the controller reads the food keeping information corresponding to the identification information.

23. The food keeping refrigerator of claim 22, wherein the reading device comprises at least one of an RFID reading device, an image photographing device, or a barcode reading device.

24. The food keeping refrigerator of claim 19, wherein the optimum keeping positions relate to colors of the light emitted in the plurality of storing chambers.

25. The food keeping refrigerator of claim 24, wherein the food keeping information further comprises information on keeping temperatures of the foods.

26. The food keeping refrigerator of claim 25, wherein the controller controls the cooling device according to the keeping temperatures.

27. The food keeping refrigerator of claim 19, wherein the light generating device comprises a plurality of LEDs for emitting different colors of light to each of the plurality of storing chambers.

28. The food keeping refrigerator of claim 19, wherein the light generating device comprises at least one dimmer that generates white light, at least one filter that transmits light having a predetermined color from the white light, and at least one optical fiber that emits the light having the color to each of the plurality of storing chambers.

29. A food keeping method for a refrigerator which keeps foods in at least one of a refrigerating chamber or a freezing chamber having a plurality of storing chambers formed therein so as to respectively refrigerate or freeze the foods stored therein through a cooling device, the method comprising:
reading food keeping information corresponding to one or more predetermined foods stored in the refrigerator;
reading light generation information of the plurality of storing chambers;
comparing the food keeping information with the light generation information and determining an optimum keeping position of the food among the plurality of storing chambers; and
displaying the optimum keeping position to a user.

30. The food keeping method of claim 29, further comprising receiving a name of the food from the user, wherein reading food keeping information includes reading the food keeping information corresponding to the name of the food.

31. The food keeping method of claim 29, further comprising reading identification information from a food identifying means provided at an inside or an outside the food or at a storing container of the food, wherein reading the food keeping information includes reading the food keeping information corresponding to the identification information.

32. The food keeping method of claim 29, wherein the food keeping information comprises at least information on a color of light.

33. The food keeping method of claim 32, wherein the food keeping information further comprises information on a keeping temperature of the food.

34. The food keeping method of claim 33, further comprising controlling the cooling device according to the keeping temperature information.

35. The food keeping method of claim 29, further comprising:
generating light and emitting the light to each of the plurality of storing chambers; and
generating the light generation information on the light generated in the plurality of storing chambers.

* * * * *